M. WALZ.
Tap-Valve.
No. 210,227.  Patented Nov. 26, 1878.
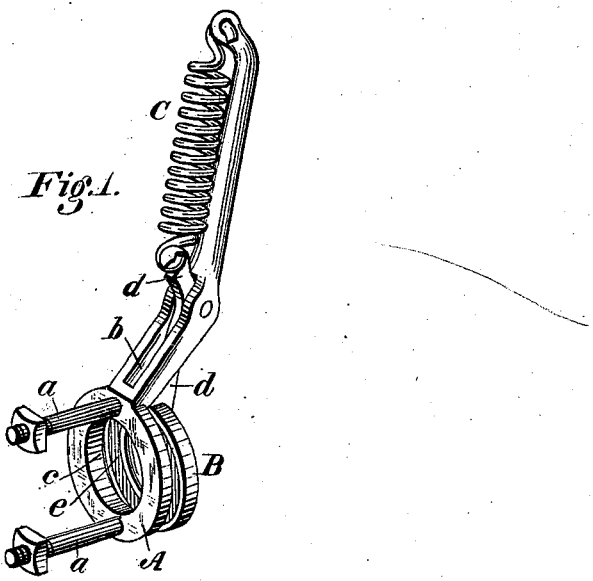
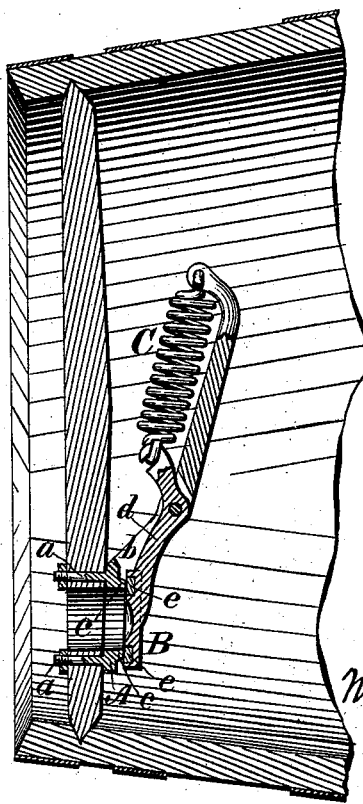
Witnesses:
Donn P. Twitchell
D. P. Cowl
Inventor:
Maximilian Walz
By his atty.
Dodgerson

UNITED STATES PATENT OFFICE.

MAXMILIAN WALZ, OF PITTSBURG, PENNSYLVANIA.

IMPROVEMENT IN TAP-VALVES.

Specification forming part of Letters Patent No. 210,227, dated November 26, 1878; application filed October 16, 1878.

*To all whom it may concern:*

Be it known that I, MAX. WALZ, of Pittsburg, in the county of Allegheny and State of Pennsylvania, have invented certain Improvements in Tap-Valves, of which the following is a specification:

This invention relates to a spring valve or stopper of peculiar construction, designed to be applied to the inside of a cask or other receptacle, for the purpose of closing the faucet-hole, bung-hole, or other outlet-opening, and so constructed that it will be opened by the introduction of the faucet or equivalent device.

Figure 1 represents a perspective view of my device, the valve being shown partially open. Fig. 2 represents a sectional view of a cask having my device applied thereto.

A represents a metal ring or bushing, having two threaded stems, $a$, by which to secure it in place to the interior of the cask around the hole which is to be closed. On one side the ring A has an extended arm, bent backward, as shown, in order to throw it away from the face of the cask and afford room for the closing-spring. At its outer end the arm is provided with an eye or opening to receive one end of the spring, and at or near its junction with the ring it is provided with a slot, $b$, to admit the arm of the valve proper. On its inner face the ring is provided with an annular sharp-edged flange, $c$, to form a seat or bearing for the valve.

B represents the valve proper, consisting of a metal plate having an arm, $d$, which is pivoted in the arm of ring A and connected to one end of a spiral spring, C, the opposite end of which is attached to the end of arm $a$, as shown, the arrangement being such that the spring presses the valve strongly toward the seat on the ring. In order to insure a tight joint, the valve-plate is provided with an annular groove containing a rubber packing-ring, $e$, to bear upon the flange or seat $c$, as shown.

The device being applied in the manner described and shown effectually closes the opening, but the introduction of the faucet or any other device from the outside, through the opening, will serve to force back the valve proper and permit the escape of the fluid.

The construction is such as to render the device simple, strong, and cheap. Its application requires but little labor, and when applied it is free from objection. Ordinarily the device will be made of cast-iron, and galvanized to prevent corrosion, and the screw-stems secured in place by casting the ring upon them.

The form of the parts may be modified and changes made in other details, provided the action of the parts is not altered.

Having described my invention, what I claim is—

1. The ring A, provided with the arm, in combination with the pivoted valve B and spring C.

2. The device for closing casks, &c., consisting of the ring A, provided with the threaded shanks and slotted arm, the pivoted valve B, provided with the rubber packing, and the spiral spring C, applied as shown.

MAXMILIAN WALZ.

Witnesses:
 HENRY FUCHS,
 CHARLES BRUCKERY.